(12) United States Patent
Lary et al.

(10) Patent No.: US 6,988,155 B2
(45) Date of Patent: Jan. 17, 2006

(54) AGGREGATION OF HARDWARE EVENTS IN MULTI-NODE SYSTEMS

(75) Inventors: Richard A. Lary, Tualatin, OR (US); Daniel H. Bax, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/968,768

(22) Filed: Oct. 1, 2001

(65) Prior Publication Data

US 2003/0065853 A1    Apr. 3, 2003

(51) Int. Cl.
    *G06F 13/24* (2006.01)
(52) U.S. Cl. ..................... 710/260; 710/266
(58) Field of Classification Search ............ 710/260, 710/261, 262, 263, 264, 266, 268, 269; 712/31; 713/300
    See application file for complete search history.

(56) References Cited

U.S. PATENT DOCUMENTS

| | | | |
|---|---|---|---|
| 5,133,056 A * | 7/1992 | Miyamori ............... 710/264 |
| 5,165,018 A | 11/1992 | Simor | |
| 5,282,272 A * | 1/1994 | Guy et al. ............... 710/116 |
| 5,649,112 A | 7/1997 | Yeager et al. | |
| 5,671,356 A | 9/1997 | Wang | |
| 6,055,643 A | 4/2000 | Chaiken | |
| 6,219,742 B1 | 4/2001 | Stanley | |
| 6,247,077 B1 | 6/2001 | Muller et al. | |
| 6,247,091 B1 * | 6/2001 | Lovett ..................... 710/260 |
| 6,256,740 B1 | 7/2001 | Muller et al. | |
| 6,272,618 B1 * | 8/2001 | Tyner et al. ............... 712/31 |
| 6,457,135 B1 | 9/2002 | Cooper | |
| 6,691,234 B1 * | 2/2004 | Huff ........................ 713/300 |

\* cited by examiner

*Primary Examiner*—Khanh Dang
(74) *Attorney, Agent, or Firm*—Abdy Raissinia

(57) ABSTRACT

The aggregation of hardware events in multi-node systems is disclosed. An event occurring at a remote node is forwarded to a primary node, by firmware of the remote node writing to a first register of the primary node. The event is propagated from the first register of the primary node to a second register node. In automatic response, an interrupt is generated at the primary node. An interrupt handler of the primary node, in response to generation of the interrupt, then invokes code at the primary node to handle the event occurring at the remote node.

17 Claims, 5 Drawing Sheets

A AGGREGATION OF HARDWARE EVENTS IN MULTI-NODE SYSTEMS

BACKGROUND OF THE INVENTION

1. Technical Field

This invention relates generally to multi-node computer systems, which are computer systems in which there is more than one node having a processor, memory, and so on, and more particularly to managing hardware events generated by the nodes of such systems.

2. Description of the Prior Art

In a computer system, various hardware generate events that need to be handled. For example, the Advanced Configuration and Power Interface (ACPI) specification provides for a power management and configuration mechanism. In ACPI-compatible computer systems with ACPI-compatible hardware, the systems themselves can be turned on and off in response to internal and external events, and the specific pieces of hardware can also be managed from a power vantage point. A network card in a low-power mode, for instance, may generate an event when it receives a packet of data from the network to which it is attached, and wake up from the low-power mode. This event is received by the computer system of which the network card is a part, so that, for example, the computer system may itself exit a lower-power mode it had previously entered. Another type of event is the hot-plug event, which results from a hardware card being inserted into or removed from a computer system while the system is on.

A disadvantage to ACPI events, as well as other types of hardware events, is that they presume handling thereof by the computer system of which the hardware generating the events are a part. That is, frequently hardware events are specified in accordance with an architecture that is multi-node system unaware, and thus presumes that the architecture is a single-node system. In multi-node computer systems, there are a number of nodes, each having its own processors, memory, and so on, over which processing is distributed. Furthermore, chipsets that implement ACPI event hardware are themselves typically multi-node unaware. Operating systems that are ACPI aware generally presume a single instance of ACPI event hardware in the system, and are also usually unaware of replicated ACPI event hardware.

Current hardware event handling architectures, therefore, frequently assume that the events generated within a given remote node of a multi-node computer system will be handled by that node. There is no mechanism, for instance, for a primary or boot node of the system to receive notification of the event, nor for this node to handle the event and to direct the remote node as to how to process the event. There is also no mechanism provided by standard ACPI event hardware to inform an operating system on which node an event occurred. This is problematic, because operating system policies for handling hardware then assume a single instance of ACPI event hardware for the entire system. However, this assumption does not hold true for a multi-node system designed around standard ACPI event hardware. For these described reasons, as well as other reasons, there is a need for the present invention.

SUMMARY OF THE INVENTION

The invention relates to the aggregation of hardware events in multi-node systems. In a method of the invention, an event occurring at a remote node is forwarded to a primary node, by firmware of the remote node writing to a first register of the primary node. The event is propagated from the first register of the primary node to a second register of the primary node. An interrupt is then generated, in automatic response, at the primary node. An interrupt handler of the primary node, in response to generation of the interrupt, then invokes code at the primary node to handle the event occurring at the remote node.

A multi-node system of the invention includes a primary node and one or more remote nodes. The primary node has first and second registers communicatively coupled to one another. The second register is normally reserved for primary node events. The primary node also includes multi-node-unaware code to handle the events, where the code is invoked in response to interrupts, which are themselves generated in response to forwarding of the events to the second register from the first register. The events occur at the remote nodes, and are forwarded to the first register of the primary node to cause ultimate handling of the events by the primary node. The events are automatically propagated from the first register to the second register of the primary node.

An article of manufacture of the invention includes a computer-readable medium and means in the medium. The means is for automatically propagating an event written to a first register of a primary node to a second register of the primary node to forward an event occurring at a remote node from the first register to the second register. An interrupt is generated at the primary node in automatic response to writing to the second register. The means is also for invoking code at the primary node to handle the event in response to generation of the interrupt. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
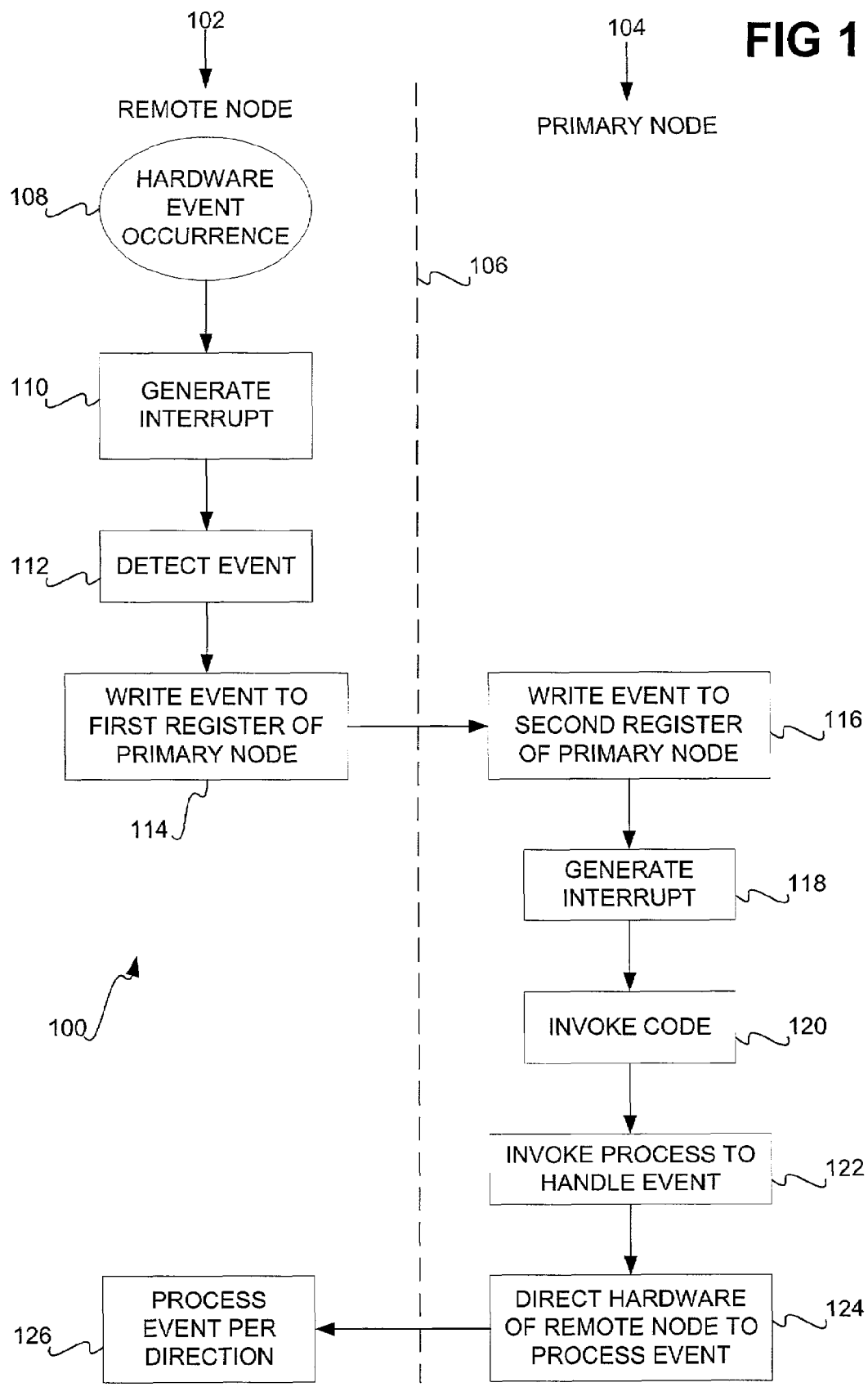
FIG. 1 is a flowchart of a method according to a preferred embodiment of the invention, and is suggested for printing on the first page of the issued patent.

FIG. 1 shows a method 100 according to a preferred embodiment of the invention. The functionality of the method 100 may be implemented as a means in a computer-readable medium of an article of manufacture. For instance, the computer-readable medium may be a recordable data storage medium or a modulated carrier signal. Parts of the method 100 are performed at a remote node and at a primary, or boot, node of a multi-node system, as indicated by the columns 102 and 104, respectively, as separated by the dotted line 106.

A hardware event first occurs at the remote node (108). The hardware event may be an Advanced Configuration and Power Interface (ACPI) event, such as a hot plug event, or another type of hardware or other event. The event generates an interrupt at the remote node (110), such as a Platform Management Interrupt (PMI). A component of the remote node specifically generates the interrupt, such as an interrupt router. In response to the generation of the interruption, a firmware interrupt handler detects the event and is invoked on the remote node (112). The firmware interrupt handler forwards the event from the remote node to the primary node by writing the event to a first register of the primary node (114). For instance, a firmware PMI handler of the remote node may route the event to a General Purpose Input/Output (GPIO) register of the primary node.

At the primary node, in automatic response to the writing of the event to the first register, the event is propagated by direct connection of the output of the first register to the input of a second register of the primary node (116). The second register is preferably normally reserved for events occurring at the primary node, not for events occurring at the remote node. In this way, the method 100 leverages registers of the primary node, such as the second register, that are normally used only for events occurring at the primary node. In the case of ACPI events, the second register may be a General Purpose Event (GPE) register reserved for such events. The writing of the event to the second register causes an interrupt to be generated at the primary node (118), such as a System Configuration Interrupt (SCI) interrupt.

Generation of the interrupt at the primary node in turn causes code to be invoked (120). The code is for handling the event that ultimately gave rise to the interrupt. For example, in the case of ACPI events, the code may be the ACPI driver of the operating system (OS). The code may be multi-node unaware, in that the code itself is not aware that the event was not generated at the primary node itself. In this way, the method 100 is able to use standard drivers, such as standard ACPI drivers, and thus does not require the rewriting of these drivers to accommodate events occurring at nodes other than the primary node.

The code itself invokes a specific process to handle the event (122). The process, conversely, is multi-node aware, and is designed to specifically accommodate events that occur at nodes other than the primary node. For instance, the process may be an ACPI Machine Language (AML) method, where AML is a compact, tokenized, and abstract machine language. The process appropriately directs the remote node to process the event (124), such that the event is processed at the remote node per this direction (126). For example, the process may remotely manipulate the hardware, such as a controller or other hardware, at which the event occurred.

Technical Background

Figure 2:
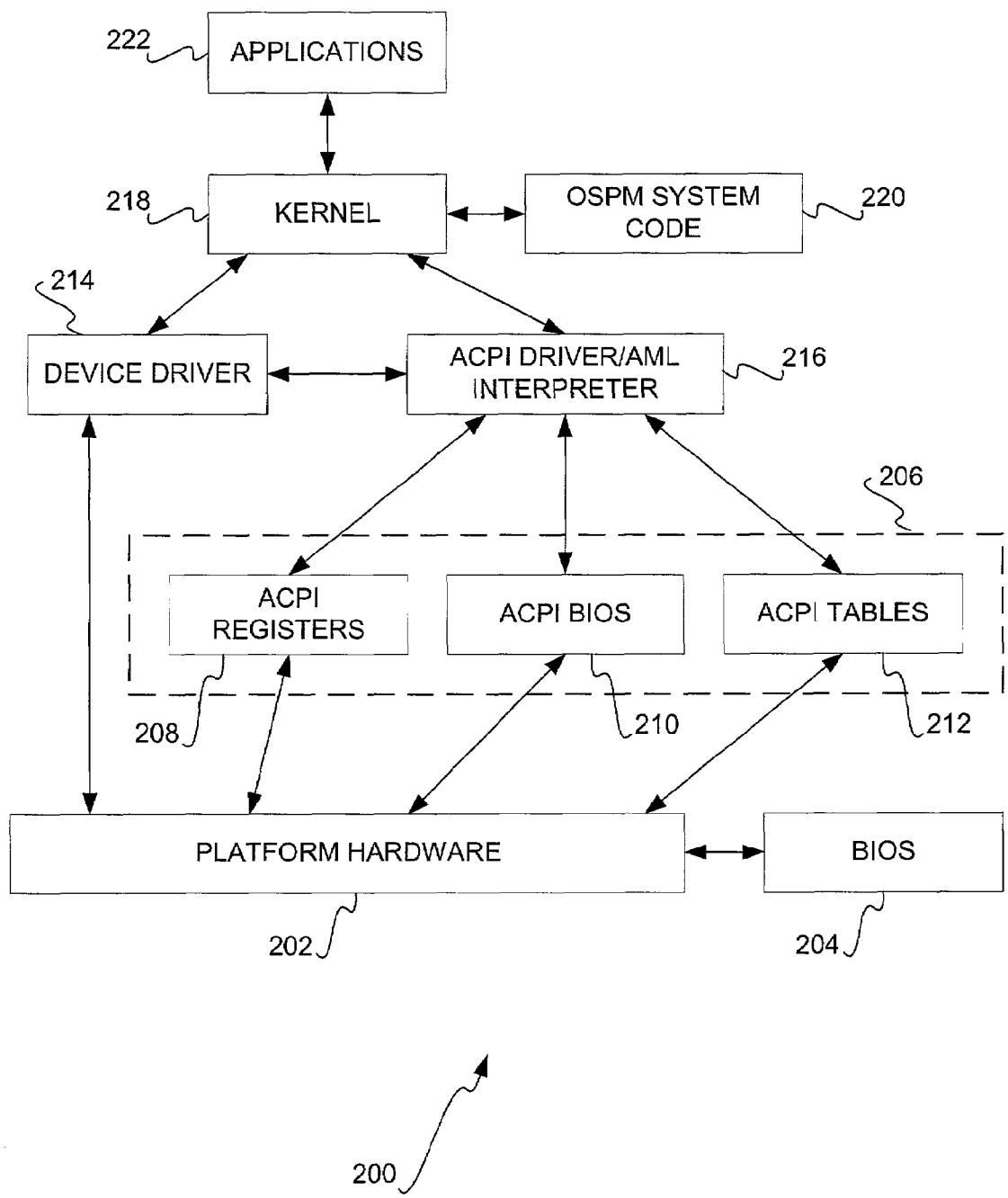
FIG. 2 is a diagram of an example hardware event architecture in conjunction with which an embodiment of the invention can be implemented.

FIG. 2 shows an example event architecture 200 in accordance with which embodiments of the invention may be implemented. The architecture 200 is specifically for ACPI events, and is described in relation to a single-node system, which can then be extended to a multi-node system per embodiments of the invention. The platform hardware 202 includes controller cards and other types of hardware that generate ACPI events. The hardware 202 may receive its settings, for instance, from a Basic Input/Output System (BIOS) 204, which is a type of firmware. OS-independent components 206 include ACPI registers 208, an ACPI BIOS 210, and ACPI tables 212. The ACPI registers 208 may include the second registers described in the previous section of the detailed description. The ACPI BIOS 210 is a type of firmware, and may record the ACPI settings of the hardware 202. The ACPI tables 212 describe the interfaces to the hardware 202, for use by the ACPI driver and AML interpreter 216.

The ACPI driver and AML interpreter 216 preferably include or have access to the process described in the previous section of the detailed description that is invoked by the ACPI driver to process a remote node event. The ACPI driver is typically standard for a given OS, and includes an AML interpreter to interpret and parse processes written in AML. That is, whereas the processes may be non-standard and specific to a given situation, such as remote node events, the ACPI driver itself is typically standard. The ACPI driver and AML interpreter 216 interact with the OS device driver 214 for the platform hardware 202. A device driver is a software routine that links the hardware to the OS.

Furthermore, both the device driver 214 and the ACPI driver and AML interpreter 216 interact with the OS kernel 218. A kernel is a fundamental part of the OS that usually resides in memory at all times and provides basic services. It is the part of the OS that is closest to the hardware, and typically activates the hardware by interfacing with the device driver 214. On top of the kernel 218 are application programs 222 running on the computer system. The kernel 218 also interacts with OS Power Management (OSPM) system code 220, which is the part of the OS designed to provide and supervise power management services.

Figure 3:
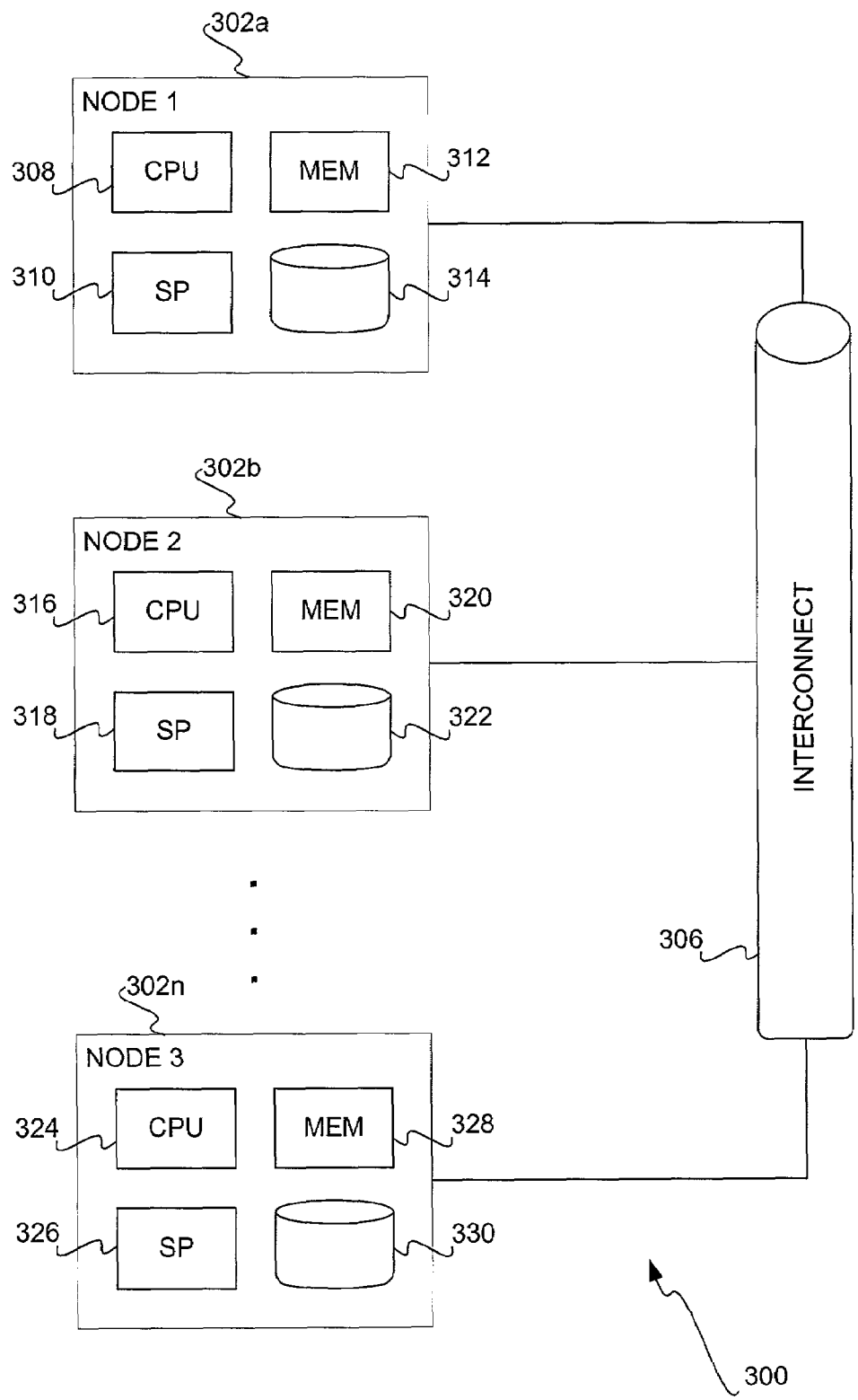
FIG. 3 is a diagram an example multi-node system in conjunction with which an embodiment of the invention can be implemented.

FIG. 3 shows an example multi-node system 300 in conjunction with which embodiments of the invention may be implemented. The multi-node system 300 includes a number of nodes 302a, 302b, . . . , 302n interconnected via an interconnect 306. One of the nodes is a primary, or boot, node, and the other of the nodes are remote nodes to this primary node. Each of the nodes further may optionally include any or all of the following: one or more central processing units (CPU), and/or volatile or non-volatile memory, and one or more storage devices, such as hard disk drives, floppy disk drives, and so on. For instance, the node 302a has CPU 308, memory 312, service processor 310, and storage device 314. Similarly, the node 302b has CPU 316, service processor 318, memory 320, and storage device 322. Finally, the node 302n has CPU 324, service processor 326, memory 328, and storage device 330.

Remote Node Hardware Event Aggregation to Primary, or Boot, Node

Figure 4:
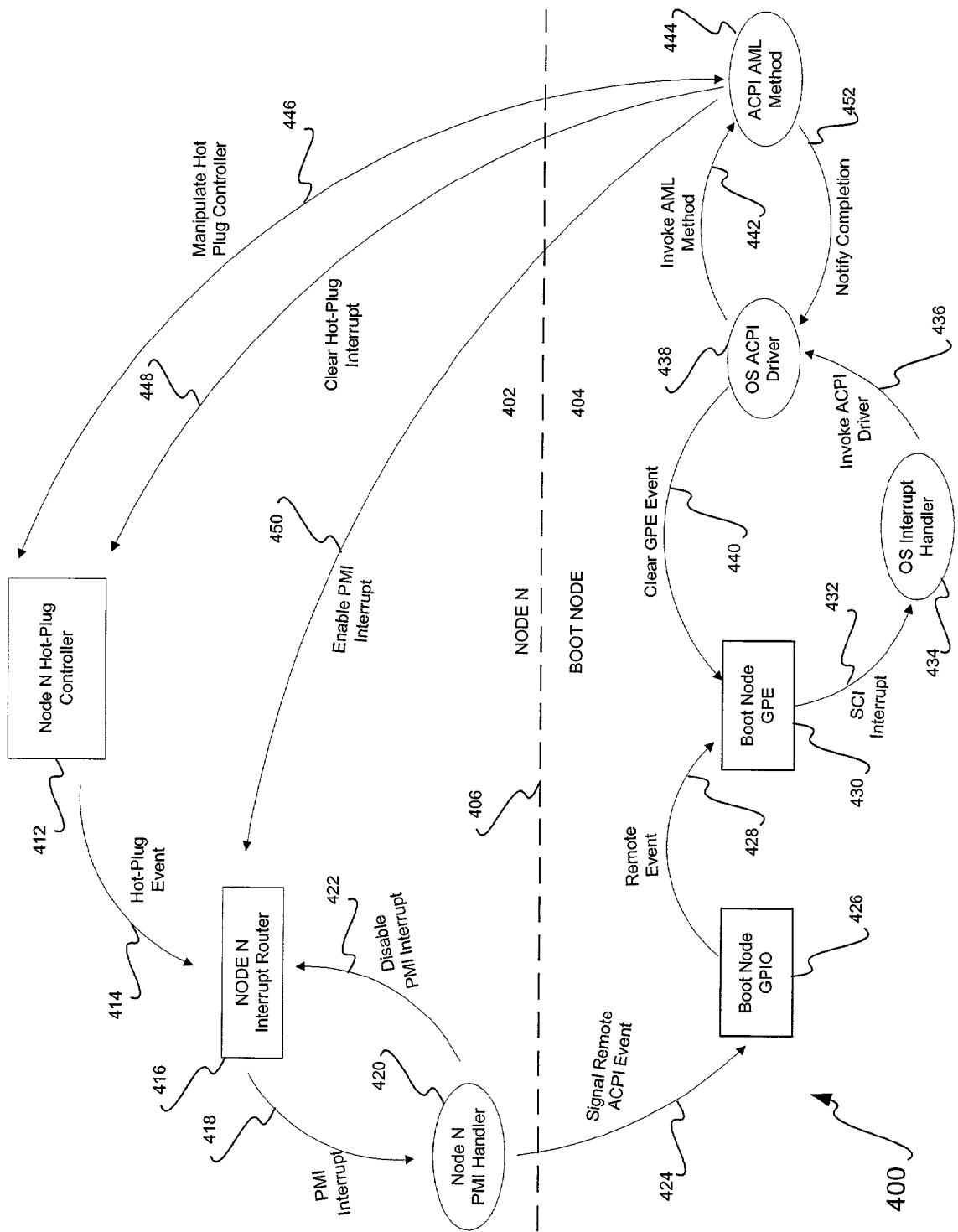
FIG. 4 is a diagram showing in detail the overall flow of event forwarding and processing, such as in conjunction with the event architecture of FIG. 2, within a multi-node system, such as that of FIG. 3, according to an embodiment of the invention.

FIG. 4 is a flow diagram 400 illustrating how one embodiment aggregates hardware events from remote nodes to a primary, or boot, node. The diagram 400 is divided into functionality performed by a first remote node 402 also referred to as remote node N, and a primary, or boot, node 404. The functionality performed by the first remote node 402 is divided from functionality performed by the primary node 404 by the dotted line 406. Other remote nodes besides the remote node 402 may also be included.

The diagram 400 is described in relation to aggregation, or coalescing, of an event at the first remote node 402 to the primary node 404. An event occurs at a hot-plug controller 412 of the node 402, as indicated by the line 414. The event is a hot-plug ACPI event. The controller 412 detects insertions and removals of hardware cards to and from the node 402. The event is detected by an interrupt router 416 of the node 402, which in response generates a PMI interrupt, as indicated by the line 418. The PMI interrupt handler 420 of the node 402 in response to generation of this interrupt initially disables the PMI interrupt, as indicated by the line 422. The interrupt handler 420 then signals the event to the primary node 404 by writing the event to a GPIO register 426 of the primary node 404, as indicated by the line 424.

The writing of the event to the GPIO register 426 of the primary node 404 is automatically forwarded the event to a GPE register 430 of the primary node 404, as indicated by the line 428. This is because the GPIO register 426 is at least communicatively coupled, and preferably directly connected, to the GPE register 430. Writing of the event to the GPE register 430 causes an SCI interrupt to be generated, as indicated by the line 432. The OS interrupt handler 434 handles the SCI interrupt, in response invoking the ACPI driver 438 of the node 404, as indicated by the line 436. The driver 438 in response invokes the AML method 444, as indicated by the line 442. The AML method 444 is particular to handling of remote hardware events, whereas the driver 438 is preferably a standard ACPI driver not modified for handling remote hardware events. Similarly, the GPE register 430 is an ACPI register normally used for handling local hardware events.

The AML method 444 first manipulates the controller 412, as indicated by the line 446, to handle the remote event that initiated at the controller 412. Once this has occurred, it clears the hot-plug event, as indicated by the line 448, and re-enables the PMI interrupt, as indicated by the line 450. It finally notifies the driver 438 that it has completed processing of the event, as indicated by the line 452, and the event from the GPE register 430 is cleared, as indicated by the line 440. In this way, the hot plug event generated at the hot-plug controller 412 of the first remote node 402 is aggregated to the boot node 404 for processing thereof, leveraging the register 430 and the driver 438 that are multi-node unaware and otherwise normally used for events of the primary node. This is accomplished by using the register 426 as one reserved for events of nodes other than the primary node 404, and by having a method 444 that is multi-node aware. The driver 438 is in other words multi-node-unaware code, and the method 444 is a multi-node-aware process. Other remote nodes, besides the remote node 402, are handled in an identical manner.

Figure 5:
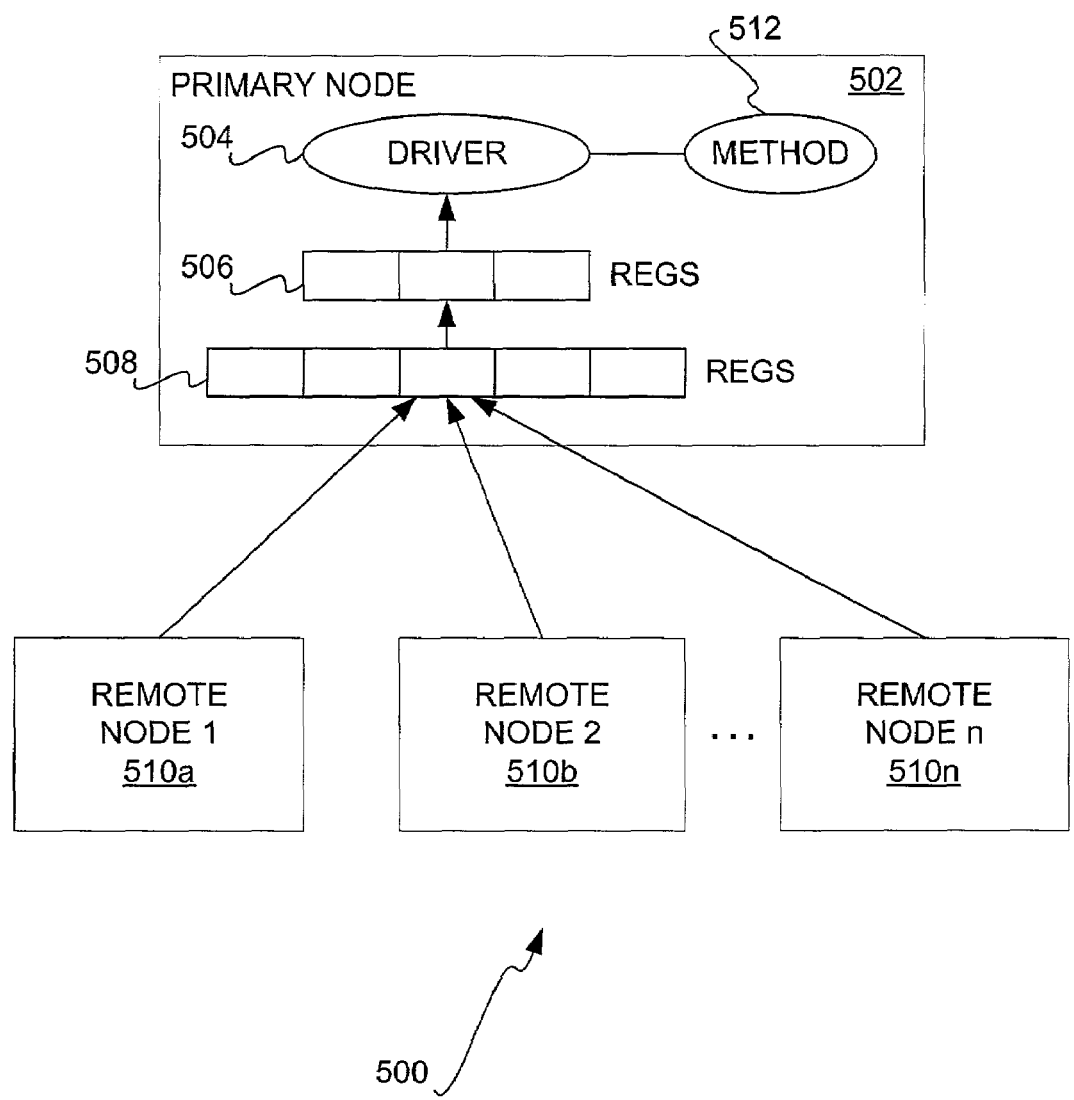
FIG. 5 is a diagram of a multi-node system, and specifically the registers of the primary node thereof, according to an embodiment of the invention.

FIG. 5 shows a multi-node system 500 according to an embodiment of the invention in which the flow diagram 400 of FIG. 4 can be implemented. The system 500 includes a primary node 502, which is communicatively coupled to a number of remote nodes 510a, 510b, . . . , 510n, such as via an interconnect not shown in FIG. 5. For instance, the primary node 502 can be the boot node 404 of FIG. 4, whereas the remote node 402 of FIG. 4 can be one of the remote nodes 510a, 510b, . . . , 510n.

The primary node 502 includes an operating system event driver 504 that is preferably multi-node unaware, and a method 512 that is preferably multi-node aware. The driver 504 can be the ACPI driver 438 of FIG. 4, whereas the method 512 can be the method 444 of FIG. 4. The driver 504 is multi-node unaware in that it is standardized for events that are generated at the primary node 502, as opposed to at the remote nodes 510a, 510b, . . . , 510n. The primary node 502 includes registers 506 and registers 508, which can include the GPE register 430 and the GPIO register 426 of FIG. 4, respectively. The registers 506 are preferably normally reserved for hardware events generated at the primary node 502 itself, whereas the registers 508 are preferably reserved for events generated at the remote nodes 510a, 510b, . . . , 510n.

Therefore, within the system 500, events generated at the remote nodes 510a, 510b, . . . , 510n are forwarded to the registers 508, which are reserved for this purpose. The events are then in response automatically forwarded from the registers 508 to the registers 506, leveraging the use of the registers 506, which are normally reserved for hardware events at the primary node 502. Preferably, the registers 508 and directly connected to the registers 506, and the registers 508 are at least communicatively coupled to the registers 506. The driver 504, which may believe that the events have been generated at the primary node 502 since it is multi-node unaware, then invokes the method 512. Because the method 512 is multi-node aware, it is able to properly handle and process the events. In this way, the multi-node-unaware driver 504 is leveraged for use within the multi-node system 500.

Advantages Over the Prior Art

Embodiments of the invention allow for advantages over the prior art. The invention allows for coalescing, or aggregating, remote node hardware events to a primary, or boot, node, within an architecture that is otherwise not multi-node aware or multi-node operable. Such aggregation is accomplished without necessarily requiring the primary node drivers of the architecture to be rewritten, and is accomplished by using the registers that are normally referenced by these drivers for primary node events. Thus, the aggregation of hardware events such as ACPI events can be accomplished without departing from the ACPI specification, and without modifying ACPI-compliant drivers.

Alternative Embodiments

It will be appreciated that, although specific embodiments of the invention have been described herein for purposes of illustration, various modifications may be made without departing from the spirit and scope of the invention. For example, the invention has been substantially described in relation to ACPI hardware events, such as hot-plug events. However, the invention itself is not so limited. For instance, the invention is amenable to other types of events, and other types of hardware events.

As another example, the invention has been substantially described in relation to drivers and certain registers that are multi-node unaware, or otherwise normally reserved for use with events generated at the primary node. The invention itself, however, is not so limited. For instance, the invention is also amenable to specially written drivers that are multi-node aware, which can then review certain registers that have been partitioned for use by all the remote nodes of a multi-node system. That is, the registers directly read by the driver can themselves be partitioned for multi-node system use, and not normally be reserved for primary node use, as the invention has been substantially described. Accordingly, the scope of protection of this invention is limited only by the following claims and their equivalents.

We claim:

1. A method comprising:

forwarding an event occurring at a remote node from the remote node to a primary node by firmware of the remote node writing to a first register of the primary node;

propagating the event from the first register of the primary node to a second register of the primary node;

generating an interrupt at the primary node in automatic response to writing to the second register of the primary node;

invoking code at the primary node to handle the event occurring at the remote node by an interrupt handler of the primary node in response to generation of the interrupt; and, invoking a multi-node-aware process at the primary node to handle the event occurring at the remote node by the code of the primary node in response to invocation of the code.

2. The method of claim 1, wherein the second register of the primary node is normally reserved for events of the primary node, and the code at the primary node is multi-node unaware.

3. The method of claim 1, wherein the second register of the primary node is reserved for events of all nodes including the primary node and the remote node, and the code at the primary node is multi-node aware.

4. The method of claim 1, further initially comprising generating a remote interrupt at the remote node in automatic response to the event occurring at the remote node, generation of the remote interrupt causing an interrupt handler of the remote node to forward the event to the primary node by writing to the first register of the primary node.

5. The method of claim 4, further comprising disabling the remote interrupt at the remote node by the interrupt handler of the remote node.

6. The method of claim 4, further initially comprising generating an event at hardware of the remote node, generation of the event causing an interrupt router of the remote node to generate the remote interrupt at the remote node in automatic response to the event occurring at the remote node.

7. The method of claim 6, further comprising the code at the primary node clearing the event at the hardware of the remote node, and enabling the remote interrupt at the remote node.

8. The method of claim 1, further comprising the code at the primary node clearing the second register of the primary node.

9. A multi-node system comprising:

a primary node having a first register and a second register, the second register communicatively coupled to the first register and normally reserved for primary node events, and multi-node-unaware code to handle the events invoked in response to interrupts generated in response to forwarding of the events from the first register to the second register; and, one or more remote nodes, the events occurring at the one or more remote nodes and forwarded to the first register of the primary node to cause ultimate handling of the events by the primary node, the events automatically propagated from the first register to the second register.

10. The system of claim 9, wherein an interrupt handler of the primary node invokes the multi-node-unaware code in response to generation of the interrupts.

11. The system of claim 9, wherein the multi-node-unaware code of the primary node invokes a multi-node-aware process at the primary node to handle the events occurring at the one or more remote nodes in response to invocation of the multi-node-unaware code.

12. The system of claim 9, wherein hardware of the one or more remote nodes generates the events, generation of the events causing interrupt routers of the one or more remote nodes to generate remote interrupts, generation of the remote interrupts causing interrupt handlers of the one or more remote nodes to forward the events to the first register of the primary node.

13. The system of claim 9, wherein the events comprise asynchronous hardware events.

14. An article comprising:

a computer-readable medium; and, means in the medium for automatically propagating an event written to a first register of a primary node to a second register of the primary node to forward an event occurring at a remote node from the first register to the second register, an interrupt generated at the primary node in automatic response to writing to the second register, and for invoking code at the primary node to handle the event in response to generation of the interrupts, wherein the second register of the primary node is one of:

normally reserved for events of the primary node, and the code at the primary node is multi-node unaware; and, reserved for events of all nodes including the primary node and the remote node, and the code at the primary node is multi-node aware.

15. The article of claim 14, wherein the second register of the primary node is directly connected to the first register of the primary node.

16. The article of claim 14, wherein the computer-readable medium is a recordable data storage medium.

17. The article of claim 14, wherein the computer-readable medium is a modulated carrier signal.

* * * * *